US009983589B2

(12) United States Patent
Foster et al.

(10) Patent No.: US 9,983,589 B2
(45) Date of Patent: May 29, 2018

(54) BUMP DETECTION AND EFFECT REDUCTION IN AUTONOMOUS SYSTEMS

(71) Applicants: CNH Industrial America LLC, New Holland, PA (US); Autonomous Solutions, Inc., Mendon, UT (US)

(72) Inventors: Christopher A. Foster, Mohnton, PA (US); Benoit Debilde, Bruges (BE); Daniel John Morwood, Petersboro, UT (US); Michael G. Hornberger, Weston, ID (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days. days.

(21) Appl. No.: 15/152,719

(22) Filed: May 12, 2016

(65) Prior Publication Data

US 2016/0334798 A1   Nov. 17, 2016

Related U.S. Application Data (60) Provisional application No. 62/160,366, filed on May 12, 2015.

(51) Int. Cl.
*G05D 1/00* (2006.01)
*B60W 30/00* (2006.01)
(Continued)

(52) U.S. Cl.
CPC ......... *G05D 1/0223* (2013.01); *A01B 69/008* (2013.01); *A01B 76/00* (2013.01);
(Continued)

(58) Field of Classification Search
CPC ........ G05D 1/00; B60W 30/00; B60W 30/02; A01B 76/00; A01B 69/00
See application file for complete search history.

(56) References Cited

U.S. PATENT DOCUMENTS 5,559,696 A * 9/1996 Borenstein ............. G01C 21/12
701/23
5,884,204 A * 3/1999 Orbach ............... A01B 63/1117
172/2

(Continued)

FOREIGN PATENT DOCUMENTS

EP    0451593 A2   10/1991
WO   9924274 A1    5/1999

OTHER PUBLICATIONS

Ericksson, Jakob; Girod, Lewis; Hull, Bret; Newton, Ryan; Madden, Samuel; Balakrishnan, Hari; "The Pothole Patrol: Using a Mobile Sensor Network for Road Surfacing Monitoring"; MIT Computer Science and Artificial Intelligence Laboratory; MobiSys '08; Jun. 17, 2008; Breckenridge, Colorado, USA.

(Continued)

*Primary Examiner* — Yonel Beaulieu
(74) *Attorney, Agent, or Firm* — Rebecca L. Henkel; Rickard K. DeMille (57) ABSTRACT

In one embodiment, a control system for a base station includes a first transceiver configured to receive a first signal and send a second signal to an agricultural vehicle. The first signal indicates at least an acceleration of the vehicle, a current velocity of the vehicle, and a location relative to a terrain where the vehicle experienced the acceleration, and the second signal indicates a vehicle target velocity. The control system includes a controller configured to determine a bump severity value based on the acceleration and the current velocity of the vehicle, mark an area indicative of the bump on a map of the terrain when the bump severity value (Continued)

exceeds a threshold, and automatically generate the second signal when the vehicle enters the area. The target velocity is based on a proximity of the vehicle to the bump, the bump severity value, or some combination thereof.

20 Claims, 7 Drawing Sheets (51) Int. Cl.
    *B60W 30/02* (2012.01)
    *A01B 69/00* (2006.01)
    *A01B 76/00* (2006.01)
    *G05D 1/02* (2006.01)
    *A01B 69/04* (2006.01)

(52) U.S. Cl.
    CPC ........... *B60W 30/02* (2013.01); *G05D 1/0274* (2013.01); *G05D 2201/0201* (2013.01)

(56) References Cited

U.S. PATENT DOCUMENTS

| | | | |
|---|---|---|---|
| 7,835,832 | B2 | 11/2010 | Macdonald et al. |
| 8,165,746 | B2 | 4/2012 | Tueshaus |
| 8,451,140 | B2 | 5/2013 | Piccinini et al. |
| 8,744,126 | B1 * | 6/2014 | Rohrschneider ..... G06K 9/0063 382/100 |
| 2001/0044685 | A1 | 11/2001 | Schubert |
| 2004/0122580 | A1 | 6/2004 | Sorrells |
| 2008/0015743 | A1 | 1/2008 | Haug |
| 2008/0059015 | A1 | 3/2008 | Whittaker et al. |
| 2010/0235032 | A1 | 9/2010 | Sung |
| 2011/0054729 | A1 * | 3/2011 | Whitehead ........... A01B 69/007 701/31.4 |
| 2012/0215394 | A1 | 8/2012 | Wang |
| 2012/0215410 | A1 * | 8/2012 | McClure .............. A01B 79/005 701/50 |
| 2014/0163836 | A1 | 6/2014 | Um et al. |
| 2017/0010619 | A1 * | 1/2017 | Foster .................. G05D 1/0223 |

OTHER PUBLICATIONS

Stavens, David; Thrun, Sebastian; "A Self-Supervised Terrain Roughness Estimator for Off-Road Autonomous Driving"; Stanford Artificial Intelligence Laboratory computer Science Department; Jun. 27, 2012; Sanford, California, USA.

Wellingtion, Carl; Stentz, Anthony (Tony); "Online Adaptive Rough-Terrain Navigation in Vegetation"; Robotics Institute Carnegie Melon University; Apr. 26, 2004; Pittsburgh, Pennsylvania, USA.

Hague, T.; Marchant, J.A.; Tillett, N. D.; "Ground based sensing for autonomous agricultural vehicle"; Silsoe Research Institute, Elesevier Science B.V.; Jan. 2000; Wrest Park, Silsoe, United Kingdom.

* cited by examiner

BUMP DETECTION AND EFFECT REDUCTION IN AUTONOMOUS SYSTEMS

CROSS REFERENCE TO RELATED APPLICATIONS

This application claims priority from and the benefit of U.S. Provisional Patent Application No. 62/160,366, entitled "BUMP DETECTION AND EFFECT REDUCTION IN AUTONOMOUS SYSTEMS," filed May 12, 2015, which is hereby incorporated by reference in its entirety.

BACKGROUND

The present application relates generally to autonomous agricultural systems, and more specifically, to systems and methods for detecting bumps and reducing their effects on autonomous agricultural vehicles.

Some terrains (e.g., fields) may develop ruts from runoff water over time. In particular, it is not uncommon for ruts to form on fields located on the side of a hill due to drainage. Additionally, there may be other obstacles (e.g., rocks) and/or adverse conditions (e.g., soft soil) present in some fields. These ruts, obstacles, and/or adverse conditions may be difficult to detect with sensors due to crops growing above and covering the ruts, obstacles, and/or adverse conditions. As such, base stations controlling autonomous agricultural vehicles working the fields may not have knowledge of the existence of the ruts, obstacles, and/or adverse conditions and may instruct the autonomous agricultural vehicle to drive at normal operating velocities through them. In some instances, driving the autonomous agricultural vehicle through the ruts, obstacles, and/or adverse conditions may lead to undesired conditions of the vehicle and/or a loss of control of the vehicle.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In one embodiment, a control system for a base station includes a first transceiver configured to receive a first signal from a second transceiver of an agricultural vehicle and to send a second signal to the second transceiver. The first signal is indicative of at least an acceleration of the agricultural vehicle, a current velocity of the agricultural vehicle, and a location relative to a terrain of the agricultural vehicle where the agricultural vehicle experienced the acceleration, and the second signal is indicative of at least a target velocity for the agricultural vehicle. The control system also includes a first controller communicatively coupled to the first transceiver. The first controller is configured to determine a bump severity value based at least in part on the acceleration and the current velocity of the agricultural vehicle, mark an area indicative of the bump on a map of the terrain when the bump severity value exceeds a threshold bump severity value at the location where the agricultural vehicle experienced the acceleration, and automatically generate the second signal when the agricultural vehicle enters the area on the map, wherein the target velocity is based at least in part on a proximity of the agricultural vehicle to the bump, the bump severity value, or some combination thereof.

In one embodiment, a method for controlling an agricultural vehicle includes accessing, using a processor, a threshold bump severity value proportional to a velocity of an agricultural vehicle, receiving, at the processor, data indicative of a bump in a terrain from one or more sensors coupled to the agricultural vehicle, determining, using the processor, a bump severity value based on the data, marking, using the processor, an area indicative of the bump on a map of the terrain when the bump severity value exceeds the threshold bump severity value, monitoring, using the processor, a location of the agricultural vehicle relative to the terrain on the map based on data indicative of the location received from the one or more sensors, and automatically generating a signal, using the processor, that instructs the agricultural vehicle to modify its velocity based at least in part on the location of the agricultural vehicle relative to the area, the bump severity value, or some combination thereof.

In one embodiment, an autonomous agricultural system includes an agricultural vehicle. The agricultural vehicle includes a first transceiver configured to send a first signal to a second transceiver of a base station and to receive a second signal from the second transceiver of the base station. The first signal is indicative of at least an acceleration of the agricultural vehicle, a current velocity of the agricultural vehicle, and a location, relative to a terrain, of the agricultural vehicle where the agricultural vehicle experienced the acceleration, and the second signal is indicative of at least a target velocity or a route for the agricultural vehicle. The agricultural vehicle also includes a first controller communicatively coupled to the first transceiver. The first controller is configured to automatically control the agricultural vehicle based at least in part on the second signal by instructing an automated steering control system and an automated speed control system to direct the agricultural vehicle according to the target velocity or the route. The agricultural vehicle also includes a sensor communicatively coupled to the first controller. The sensor is configured to detect the acceleration. The agricultural vehicle also includes a spatial locating device communicatively coupled to the first controller. The spatial locating device is configured to obtain data indicative of the location and the current velocity of the agricultural vehicle. The base station includes the second transceiver configured to receive the first signal and send the second signal and a second controller communicatively coupled to the second transceiver. The second controller is configured to determine a bump severity value based on the acceleration and the current velocity of the agricultural vehicle, and to identify an area indicative of the bump within the terrain when the bump severity value exceeds a bump value threshold at the location, relative to the terrain, where the agricultural vehicle experienced the acceleration, and automatically generate the second signal indicative of at least the target velocity or the route when the agricultural vehicle enters the area. The target velocity is based on a proximity to the bump, a severity of the bump, or some combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As may be appreciated, "autonomous" agricultural vehicle may refer the vehicle's ability to operate independently of human input.

Operating an autonomous agricultural vehicle (referred to as "vehicle" herein), such as tractors, seeders, harvesters, implements, and the like, in terrains (e.g., fields) with undetected ruts and/or obstacles (e.g., rocks, soft soil) may lead to undesired maintenance conditions of the vehicle and/or a loss of control of the vehicle. There exists a need for an autonomous system that is configured to detect and keep track of the ruts and/or obstacles so the operation (e.g., velocity and/or direction) of the vehicle can be modified to reduce the effects of the ruts and/or obstacles.

Accordingly, the present disclosure relates to an autonomous system that may be used to detect bumps, mark the locations of the bumps on a map, and/or modify the velocity and/or direction of a vehicle based on at least the proximity of the vehicle to the bumps, the current velocity of the vehicle, and/or the severity of the bumps. To achieve this, the vehicle may detect bumps in a terrain as the vehicle traverses the terrain and send signals indicative of the bumps to a base station controlling the vehicle. The base station may include a controller that maintains (e.g., updates and/or stores) a map of the terrain being worked by the vehicle, and the controller may mark an area on the map where the signals indicate bumps were detected. In some embodiments, the autonomous vehicle and the base station may have a client-server type relationship, where the autonomous vehicle is the client and the base station is the server. For example, the autonomous vehicle client controller may send signals indicative of the bumps to the base station server controller, which generates the map. In some embodiments, the base station may control numerous autonomous vehicles working in the same field and may forward the map to all of the vehicles or control all of the vehicles using the map depending on where the vehicles are in the field. To that end, the base station may receive data indicative of bumps from all of the autonomous vehicles in the field and update the map based on all of the data as the vehicles traverse the field.

In some embodiments, the map may be represented by any suitable visualization, such as a two-dimensional (2D) map, a heat map (e.g., topographical), a three-dimensional (3D) model, and so forth. When the vehicle approaches the marked areas on the map, the base station may instruct the vehicle to slow down so that if the bump (e.g., rut and/or other obstacle) is hit again, it is done at a much slower velocity to inhibit undesirable maintenance conditions of the vehicle and/or loss of control of the vehicle. In certain instances, where the severity of the bump is particularly harsh, the vehicle may be driven around (e.g., to avoid) the problematic area. If another bump is detected, the location of the bump may be marked on the map by the controller. In this way, the area indicative of a rut and/or other obstacle may be continuously grown (e.g., updated) so that the vehicle is consistently slowed when approaching the rough sections in the terrain.

In some embodiments, instead of using a base station, the autonomous vehicles may use a map that is loaded in their controllers prior to operation on the field. In some instances, the autonomous vehicles may locally generate the maps as they traverse the fields. That is, the autonomous vehicles may update the maps without communicating the data to a base station. In other instances, the maps may be updated after the job is complete and the autonomous vehicles return to a facility that includes a server controller to which the autonomous vehicle connects. The autonomous vehicle may communicate the data to the server controller, and the server controller may update a map based on the bump data and return the map to the autonomous vehicle. In some embodiments, more than one autonomous vehicle may communicate directly with one another and share data related to any bumps that are detected. In such an embodiment, the autonomous vehicles may each have a copy of a map stored that is updated with data received from their own respective sensors and also from data received from the other autonomous vehicles without communicating to a base station.

Figure 1:
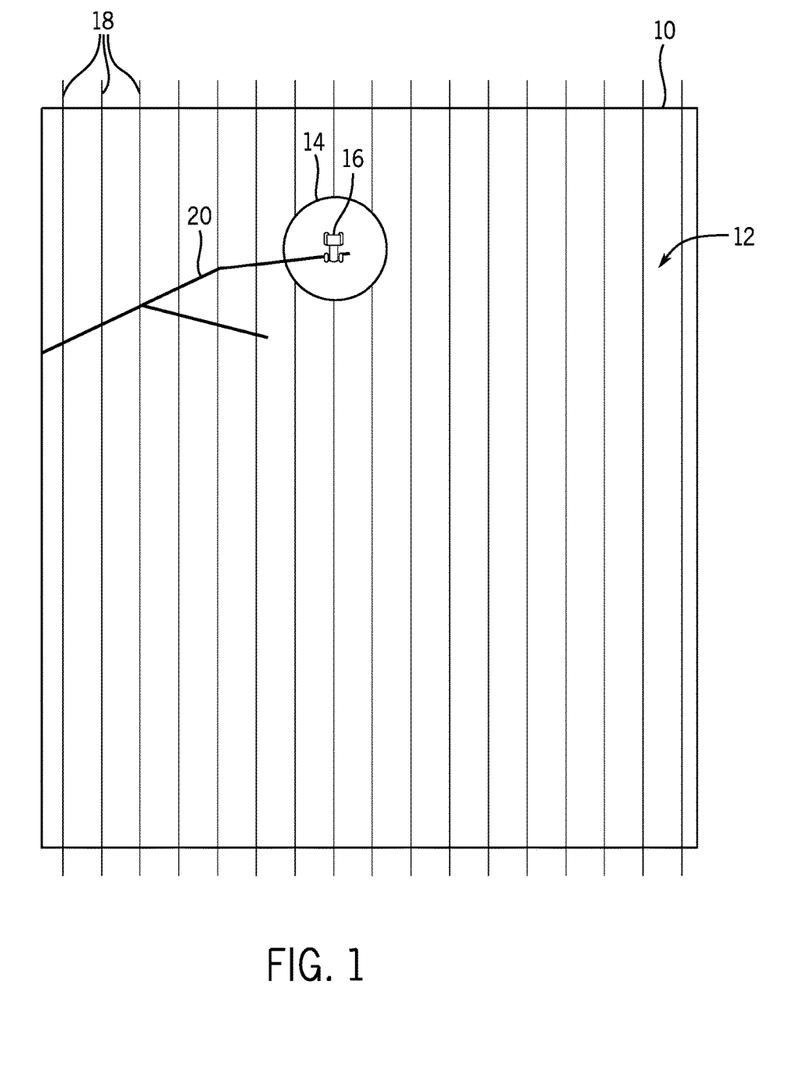
FIG. 1 is an embodiment of a two-dimensional (2D) map of a terrain including an initial marked area indicating one or more bumps detected by an autonomous agricultural vehicle.

With the foregoing in mind, FIG. 1 is an embodiment of a two-dimensional (2D) map 10 of a terrain 12 including an initial marked area 14 indicating one or more bumps was detected by a vehicle 16. As illustrated, the terrain 12 may include one or more rows 18 that the vehicle 16 traverses as it works the terrain 12. Examples of types of work the vehicle 16 may perform on the terrain 12 may include delivering an agricultural particulate material to the terrain, tilling the terrain, planting seeds, harvesting crops on the terrain, and so forth. The map 10 may include a representation of the vehicle 16 so that the location of the vehicle 16 may be tracked, and certain properties (e.g., velocity, direction) of the vehicle may be controlled based at least on its location. Also, as mentioned above, the terrain 12 may include one or more ruts 20 that develop over time. Although certain figures and examples discussed herein relate to the rut 20 to facilitate discussion, the techniques may be applied to detect and/or mark various obstacles (e.g., rocks, soft soil) and to modify operation of the vehicle in the manners disclosed herein.

The ruts 20, which may refer to a track in the ground, may be developed by runoff water, wheels of a vehicle, and the like, and may provide a difference in elevation between the ground (e.g., field surface) and the bottom of the rut 20. When the vehicle 16 drives across the rut 20, the vehicle 16 may experience a jolt or bump due to the wheels rapidly changing elevations as the wheels drop into the rut 20 and then emerge out of the rut 20. Likewise, driving over an obstacle, such as a rock, may cause an opposite change in elevation as the wheels of the vehicle 16 increase elevations when they drive on top of the rock and then decrease elevations as they drive off of the rock back onto the ground.

As previously discussed, the rut 20 and/or the obstacles may be hidden by crops growing in the terrain 12. However, the vehicle 16 may detect the rut 20 and/or obstacles as they are encountered using one or more sensors. For example, when the vehicle 16 drives across the rut 20 for the first time in the terrain 12, the vehicle 16 may experience a bump. The sensors in the vehicle may detect signals indicative of the bump severity and location in the terrain 12. The vehicle 16 may transmit the signals to a base station that may determine whether the severity of the bump is greater than a threshold bump severity value. If the bump severity value exceeds the threshold bump severity value, the base station may mark the area 14 on the map 10 of the terrain 12. The threshold bump severity value may vary with the velocity of the vehicle 16. For example, the threshold bump severity value that is measured by the sensors may decrease when the vehicle 16 is traveling slower, and the threshold bump severity value that is measured by the sensors may increase when the vehicle 16 is traveling faster. In some embodiments, the initial area 14 may include a shape, such as a circle, square, rectangle, etc. that extends around the specific location where the bump was detected.

On subsequent passes across the terrain 12, the vehicle 16 may be automatically slowed down by the base station or a server controller when the vehicle 16 enters the marked area 14. As discussed more fully below, the amount of velocity reduction may be based on the proximity of the vehicle 16 to the specific location of the bump, the current velocity of the vehicle 16, and/or the severity of the bump. For example, the velocity of the vehicle 16 may be slightly reduced if approaching a small bump or the velocity may be significantly reduced if approaching a large bump. The severity of the bump may refer to the size and/or geometry of the bump. If other bumps are detected during subsequent passes, the map 10 may be updated with an additional marked area for the new bumps.

Figure 2:
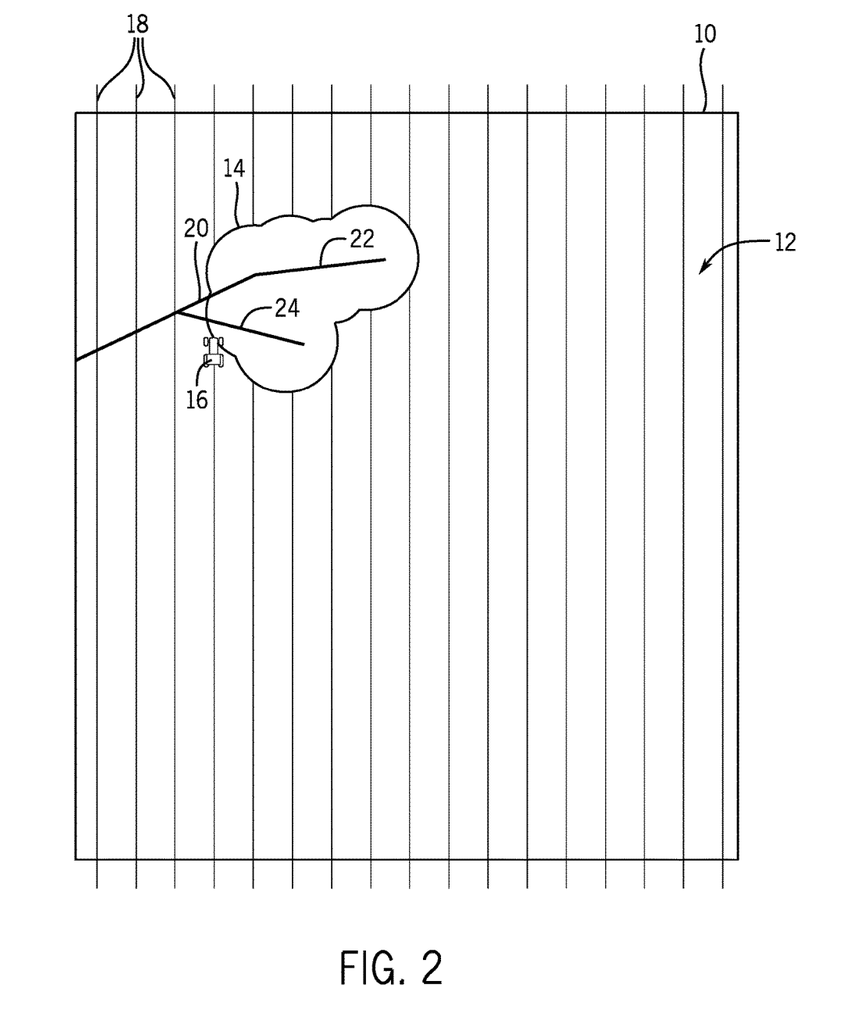
FIG. 2 is an embodiment of the 2D map of FIG. 1 including an expanded marked area indicating bumps detected by the autonomous agricultural vehicle as it traverses the terrain.

Thus, the marked area 14 may continue to grow (e.g., update or expand) as the vehicle 16 traverses the terrain 12, as shown in the 2D map 10 in FIG. 2. As depicted, the marked area 14 has expanded to follow the course of the rut 20. Indeed, the vehicle 16 detected both an upper prong 22 and a lower prong 24 of the rut 20 and the shapes that were marked on the map 10 overlap. As a result, the vehicle 16 may enter the marked area 14 from one side (e.g., the south side) and reduce its velocity as desired so it crosses the lower prong 24 at the reduced velocity. Then, while it is in the area 14 between the lower prong 24 and the upper prong 22, the vehicle 16 may maintain its reduced velocity and/or modify its velocity based on its proximity to the upper prong 22. As such, when the vehicle 16 crosses the upper prong 22, it may do so at the reduced velocity so as to reduce the effects that the rut 20 has on the vehicle 16. Once the vehicle 16 leaves the area 14 and/or as the vehicle 16 gains distance from the rut 20, the velocity of the vehicle 16 may be increased back to normal operating velocity.

In some embodiments, the area 14 may more precisely follow the rut 20 and/or other obstacles using the data obtained via the sensors on the vehicle 16. For example, the roll, pitch, and yaw of the vehicle 16 may be detected via the sensors, which may include an accelerometer (e.g., multi-axis accelerometer that measures multiple acceleration values), a gyroscope, a global positioning system (GPS), a global navigation satellite system (GNSS), an optical sensor, a radio frequency (RF) sensor, and the like. Using data signals obtained by the sensors, the controller of the base station may determine the direction of acceleration of the vehicle 16 when it encounters the rut 20 and/or obstacles, the severity (e.g., geometry including depth, width, etc.) of the rut 20, and so forth.

The controller may use one or more techniques such as line fitting to precisely map the area 14 to follow the rut 20. In some embodiments, least squares fitting techniques may be used to find the best-fitting curve to a given set of points (e.g., bump locations) by minimizing the sum of the squares of the offsets of the points from the curve.

Other suitable techniques may be used to mark the area 14 so that it follows the rut 20 more closely. For example, blob detection techniques may be used to fill areas of the map 12 that are rough or rocky. Blob detection may include methods used to detect regions in an image that differ in properties, such as detected bumps, compared to areas surrounding those regions. That is, blobs may be identified by the varying properties (e.g., bump values) in the different areas of the map and the area 14 can be marked accordingly.

Figure 3:
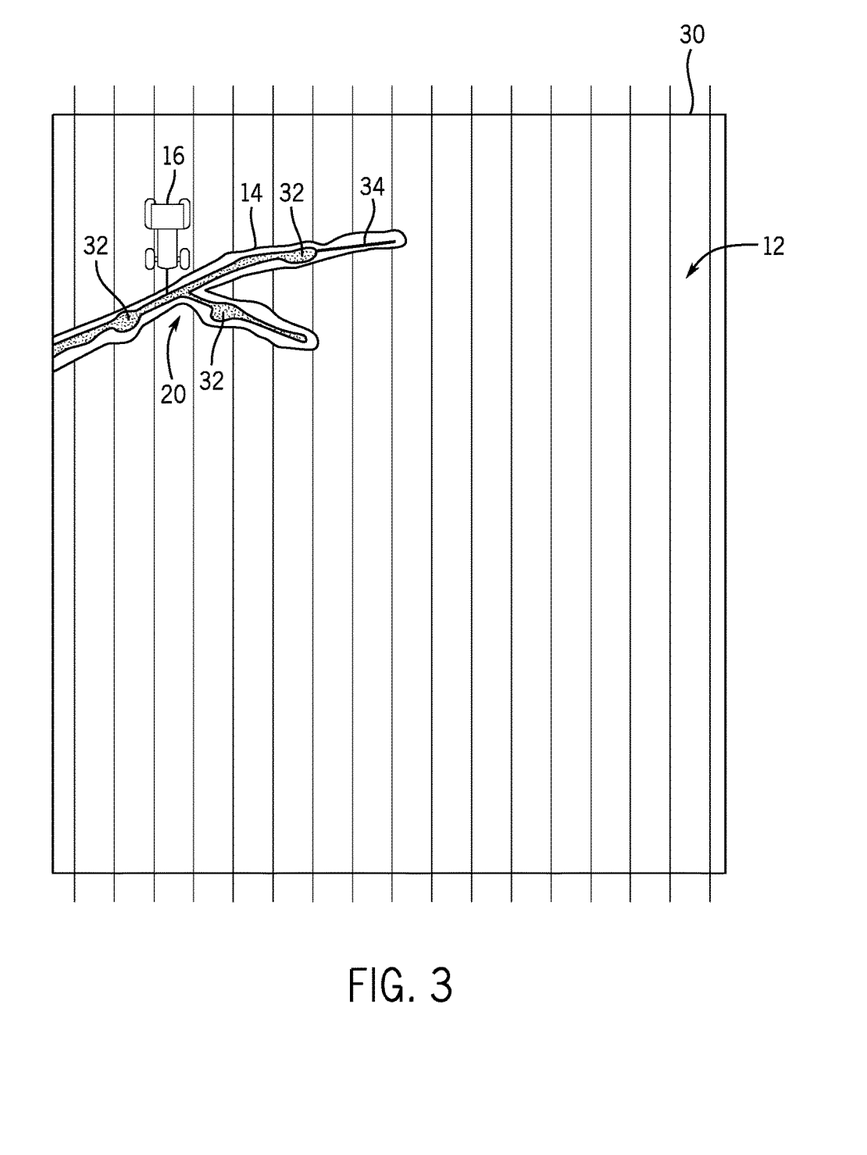
FIG. 3 is an embodiment of a heat map of a terrain including marked areas representing a rut generated based on bumps detected by the autonomous agricultural vehicle and color-coded based on bump severity.

A visualization of the terrain 12 including an area that more precisely follows and describes the rut 20 is depicted by a heat map 30 illustrated in FIG. 3. As depicted, the heat map 30 includes a marked area 14 representing the rut 20 generated based on bumps detected by the vehicle 16. In some embodiments, the area 14 may be color-coded based on bump severity (e.g., size, geometry). For example, bumps that are more severe may be colored a certain color, such as red, orange, or the like, that provides an indication of their severity. Bumps that are less severe may be colored a different certain color, such as green, blue, yellow, that provides an indication of their severity.

As depicted in the illustrated embodiment, the heat map 30 may provide a geospatial overlay view of a density of bumps by severity. As shown, the bumps with a darker blur (e.g., red) represent bumps with high severity, and the bumps with a lighter blur (e.g., green, blue, etc.) represent bumps with low severity.

It should be understood that the color coding may be configurable by a user, such as by interacting with the visualization at the base station or a server controller. Color coding the area 14 based upon bump severity may further enable the heat map 30 to display densities of severe bumps. To illustrate, the heat map 30 displays a high density of bumps colored red in the area 14 (represented by dark patches 32), which may indicate that there are numerous large bumps with high severity in close proximity (e.g., a ravine). In such a scenario, it may be desirable to stop the vehicle 16 and/or navigate the vehicle 16 to avoid the patches 32. In contrast, if there are a few areas 14 that are of high bump severity, but spread out over a larger geographic area, then it may be desirable to substantially slow the velocity of the vehicle 16 (e.g., to a first velocity) without stopping or navigating the vehicle 16 around the isolated bumpy areas 14.

Further, a portion of the area 14 that includes a small density of a few minor bumps may be represented by a suitable color (e.g., green) and a thinned out line 34. In such instances, the vehicle 16 may only be slightly slowed down (e.g., to a second velocity greater than the first) when crossing that portion of the rut 20.

In some embodiments, the heat map 30 may be generated by the controller of the base station based on the aggregated bump data (e.g., location, severity, acceleration, direction, etc.) sent from the vehicle 16. The heat map 30 may be generated by associating each pixel with a particular point on the geographic landscape of the heat map 30. Then, using the location data of the bumps, the bumps may be placed at the proper pixels based upon their respective geographical locations. The bumps may be more properly spaced apart relative to one another based upon spatial information included in or derived from the location data. Further, based at least in part on the bump severity data, a color may be applied to the bumps' pixels to represent the bumps' severity. The controller may apply a spread or blur algorithm, such as a Gaussian blur, to blend the pixels to derive the heat map 30.

Figure 4:
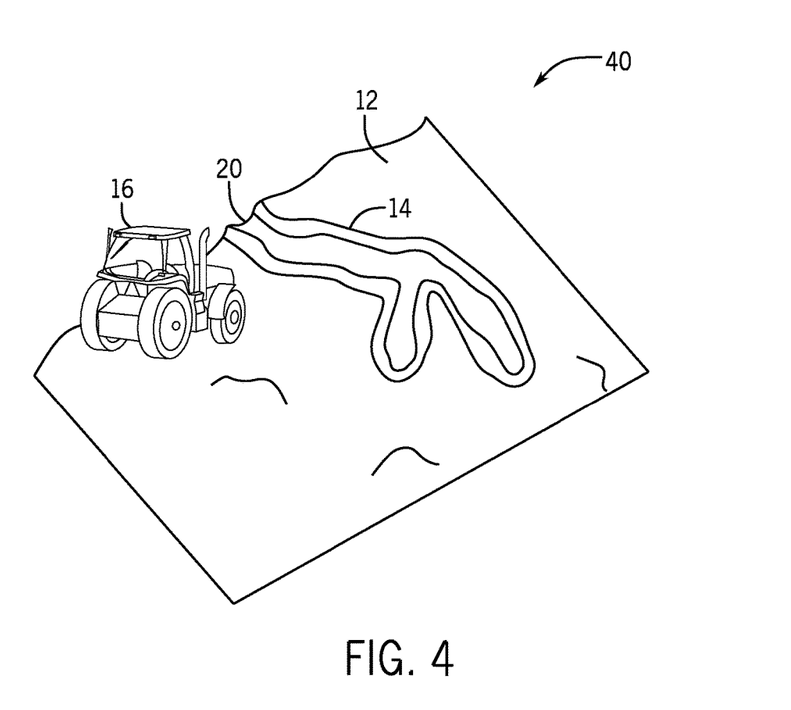
FIG. 4 is an embodiment of a three-dimensional (3D) model of a terrain including a rut generated based on bumps detected by the autonomous agricultural vehicle.

Another example of the area 14 more precisely following the rut 20 is illustrated in a three-dimensional (3D) model 40 in FIG. 4. The area 14 may include a perimeter positioned at any configurable amount of space (e.g., 0.5, 1, 2, 3, 4, 5, 10, 15 feet) away from the edges of the rut 20. The area 14 may be used by the base station to automatically slow the vehicle 16 to a desired velocity when the vehicle 16 enters the area 14 before crossing the rut 20.

The rut 20 may be generated on the map based on data detected via the one or more sensors on the vehicle 16. As previously discussed, the data may indicate the location of bumps and/or the severity of the bumps. For example, bump data sent to the base station may indicate the location of an entrance bump when one or more wheels of the vehicle 16 enter the rut 20. Bump data may also indicate the severity of the bump, which may be used to determine a depth of the rut 20 (e.g., based on the severity of the bump measured). Also, bump data may indicate the location of an exit bump where one or more of the wheels of the vehicle 16 leave the rut 20. The time difference in between the entrance bump and the exit bump, used in conjunction with a known velocity of the vehicle 16, may enable determination of the width of the rut 20. As a result, the controller of the base station may use the location of the entrance bump and the exit bump, the depth of the rut 20, and/or the width of the rut 20 to model the rut 20 three-dimensionally, as shown.

In some embodiments, the 3D model may develop (e.g., generate) the rut 20 based on data obtained via a spatial locating device, as described in detail below. For example, a spatial locating device may be mounted on a roof of the vehicle 16, and changes in the terrain 12 may lead to large and rapid movement of the spatial locating device. The controller may detect rapid changes of the velocity of the spatial locating device that are not proportional with changes in the average velocity of the vehicle 16. When those changes occur, the terrain 16 may be modeled accordingly to reflect any bumps encountered and the severity of the bumps.

As depicted, the 3D model 40 displays a fully rendered rut 20, but, in some embodiments, the 3D model 40 may be built off of a partial dataset and include only a portion of the rut 20. For example, when a bump is initially detected in the terrain 12 without other bumps being detected, only the initial bump may be displayed on the 3D model 40. However, as previously discussed, subsequently detected bumps may be used to continuously build the fully rendered rut 20.

In some embodiments, the data related to the bumps and the rut 20 and/or other obstacles may be retained (e.g., stored) and used for subsequent jobs performed by the vehicle 16, and/or other vehicles, in the terrain 12. As the vehicles 16 continue to use the terrain 12, additional ruts 20 may be detected and the maps (10, 30) and/or models 40 may be updated based on any newly detected data. At least one benefit of the disclosed techniques may include enabling an owner of the terrain 12 to become aware of ruts 20 and/or obstacles, which may enable the owner to fill the ruts 20 and/or remove the obstacles. If the ruts 20 and/or obstacles are removed, the visualizations may dynamically update based on sensor data received from the vehicles 16 that indicates the bumps have been removed (e.g., the detected bumps no longer exceed the threshold).

Further, it should be appreciated that there may be numerous vehicles 16 (e.g., 1, 2, 3, 4, 5, 6, 10, etc.) working the terrain 12 and all vehicles 16 in the terrain 12 may benefit from the disclosed techniques by being controlled by a base station using the maps (10, 30) and/or 3D model 40 when operated near the identified rut 20 and/or obstacle to reduce the effects of the rut 20. In other words, the base station may control all of the vehicles 16 working the terrain 12 using the maps (10, 30) and/or 3D model 40 to modify the vehicles' velocity and/or directions based at least on the proximity of the vehicles 16 to the rut 20, current velocity of the vehicles 16, and/or severity of the bumps.

Also, in embodiments where a base station is not used, the numerous vehicles 16 may directly communicate data to one another and generate a local map (10, 30) and/or 3D model 40 to operate near the identified rut 20 and/or obstacle to reduce the effects of the rut 20. The maps may be updated by each respective vehicle as it accumulates more data while traversing the terrain 12 and from data received from other vehicles 16 that are working the terrain 12.

Figure 5:
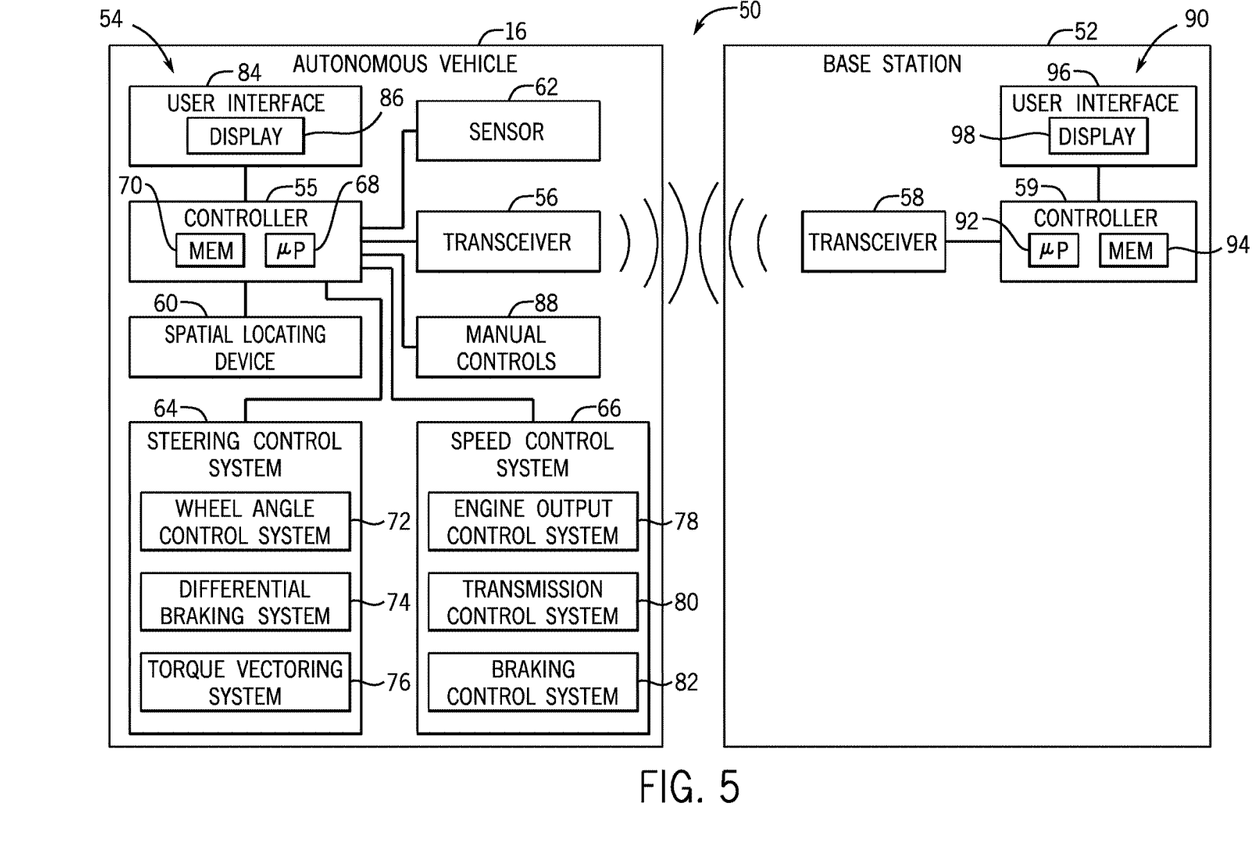
FIG. 5 is a schematic diagram of an embodiment of an autonomous system including an autonomous agricultural vehicle and a base station.

FIG. 5 is a schematic diagram of an embodiment of an autonomous agricultural system 50 including the vehicle 16 and a base station 52. In the illustrated embodiment, the vehicle 16 includes a control system 54 having a controller 55 coupled to a first transceiver 56. The first transceiver 56 is configured to send signals to and receive signals from a second transceiver 58 of the base station 52. The second transceiver 58 is communicatively coupled to a controller 59 of the base station 52. As discussed in detail below, the signals sent from the first transceiver 56 to the second transceiver 58 may indicate bump severity, bump location, acceleration, bump direction, time of bump, current velocity, location of the vehicle 16, and so forth. Also, the signals received by the first transceiver 56 from the second transceiver 58 may indicate a target velocity of the vehicle 16, route, angle of wheels, operation (e.g., start seeding, stop seeding, start tilling, stop tilling), and the like.

As will be appreciated, the first and second transceivers (56, 58) may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol.

As used herein, "velocity" (e.g., determined velocity, target velocity, etc.) refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. The velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

The vehicle control system 54 also includes a spatial locating device 60, which is mounted to the vehicle 16 and configured to determine a position of the vehicle 16, a location of the vehicle 16, a velocity of the vehicle 16, and a position of the spatial locating device. The spatial locating device 60 is also communicatively coupled to the controller 55. As will be appreciated, the spatial locating device 60 may include any suitable system configured to measure the position and/or velocity of the vehicle 16, such as a global positioning system (GPS), a global navigation satellite system (GNSS), and the like. In certain embodiments, the spatial locating device 60 may be configured to measure the position and velocity of the vehicle 16 relative to a fixed point within a terrain (e.g., via a fixed radio transceiver). Accordingly, the spatial locating device 60 may be configured to measure the position and/or velocity of the vehicle 16 relative to a fixed global coordinate system (e.g., via the GPS) or a fixed local coordinate system. Further, the spatial locating device 60 may obtain data related to its position as the vehicle 16 traverses the terrain 12, and the controller 59 may use this data to determine changes in velocity of the spatial locating device 60. Once the velocity changes are determined, the controller 59 may compare the changes to the average velocity of the vehicle 16. When disproportionate discrepancies between changes in the velocity of the spatial locating device 60 and the average velocity of the vehicle 16 exist, the controller 59 may plot out the bumpy landscape of the terrain 12 on a map (e.g., 3D model 40).

The first transceiver 56 broadcasts the determined position of the vehicle 16, location of the vehicle 16, velocity of the vehicle 16, and/or position of the spatial locating device 60 to the second transceiver 58. In some embodiments, the second transceiver 58 may send the determined positions, location, and velocity to the controller 59, which may use the determined location and position of the vehicle 16 to determine which direction to direct the vehicle 16 when the vehicle is near the rut 20 as indicated by the maps (10, 30) and/or model 40. Further, the controller 59 may use the determined velocity of the vehicle 16 to determine the amount to increase or decrease the vehicle's velocity when the vehicle 16 is near the rut 20 and/or other obstacles according to the determined velocity, proximity to the rut 20 and/or obstacles, and/or severity of approaching bumps.

In addition, the vehicle control system 54 includes one or more sensors 62. The sensors 62 may include one or more of an accelerometer, optical sensor, radio-frequency (RF) sensor, and so forth. In embodiments, where the sensor 62 is an accelerometer, the accelerometer may measure acceleration (e.g., three-dimensional acceleration) of the vehicle 16 and direction of acceleration based on detected vibrations. That is, the accelerometer may measure the roll rate, yaw rate, and pitch rate while the vehicle 16 is operating, and continuously or periodically transmit the obtained data to the second transceiver 58. The controller 59 may use the data from the accelerometer received by the second transceiver 58 to calculate a bump severity value and determine whether the value exceeds a threshold bump severity value (e.g., a predetermined threshold). In some embodiments, if the bump severity value exceeds the threshold, then the location of the bump and the severity of the bump (e.g., based on the geometry of the rut 20 determined by analyzing the data from the accelerometer) may be marked on the map (10, 30) and/or 3D model 40.

It should be appreciated that any suitable number of sensors 62 (e.g., 1, 2, 3, 4, 5, 6, 8, 10) may be included on the vehicle 16, as desired. For example, multiple sensors 62 may be included on the vehicle 16 (e.g., one on each wheel and/or axle) to provide information on the direction of acceleration caused by a bump and/or locations of the bumps, which may be used to plot the bumps in the map of the terrain 12 represented by the one or more visualizations. However, in some embodiments, only a single sensor 62 may be used (e.g., on the axle) to detect the direction of acceleration caused by contacting the rut 20 and/or other obstacle.

Additionally, the location of the sensors 62 may be configured as desired. In some embodiments, the location of the sensors 62 may vary based upon the vehicle 16 used. For example, for a seeder with numerous frame sections, a sensor 62 may be located on each of the sections to enable collecting data on a wider area of the terrain 12, which may further enable providing information on the shape of the rut 20 and/or other obstacles encountered. The location of the sensors 62 may be based on the number of sensors 62 used. For example, if only one sensor 62 is used, then the sensor 62 may be located at a position on the vehicle 16 most likely to experience vibrations from a number of different areas of the vehicle 16, such as on the axle.

In the illustrated embodiment, the control system 54 includes an automated steering control system 64 configured to control a direction of movement of the vehicle 16, and an automated speed control system 66 configured to control a speed of the vehicle 16. In addition, the control system 54 includes the controller 55 communicatively coupled to the first transceiver 56, to the spatial locating device 60, to the automated steering control system 64, and to the automated speed control system 66. The controller 55 is configured to automatically control the vehicle 16 while the vehicle 16 is in and around areas including bumps as indicated by the visualizations (maps 10, 30 and/or 3D model 40) based on signals received from the base station 52.

In certain embodiments, the controller 55 is an electronic controller having electrical circuitry configured to process data from the transceiver 56, the spatial locating device 60, and/or other components of the control system 54. In the illustrated embodiment, the controller 55 include a processor, such as the illustrated microprocessor 68, and a memory device 70. The controller 55 may also include one or more storage devices and/or other suitable components. The processor 68 may be used to execute software, such as software for controlling the vehicle 16, and so forth. Moreover, the processor 68 may include multiple microprocessors, one or more "general-purpose" microprocessors, one or more special-purpose microprocessors, and/or one or more application specific integrated circuits (ASICS), or some combination thereof. For example, the processor 68 may include one or more reduced instruction set (RISC) processors.

The memory device 70 may include a volatile memory, such as random access memory (RAM), and/or a nonvolatile memory, such as ROM. The memory device 70 may store a variety of information and may be used for various purposes. For example, the memory device 70 may store processor-executable instructions (e.g., firmware or software) for the processor 68 to execute, such as instructions for controlling the vehicle 16. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., position data, sensor data, etc.), instructions (e.g., software or firmware for controlling the vehicle, etc.), and any other suitable data.

In the illustrated embodiment, the automated steering control system 64 includes a wheel angle control system 72, a differential braking system 74, and a torque vectoring system 76. The wheel angle control system 72 may automatically rotate one or more wheels of the vehicle 16 (e.g., via hydraulic actuators) to steer the vehicle 16 along a desired route. By way of example, the wheel angle control system 72 may rotate front wheels, rear wheels, and/or intermediate wheels of the vehicle, either individually or in groups. The differential braking system 74 may independently vary the braking force on each lateral side of the vehicle to direct the vehicle 16 along the desired route. Similarly, the torque vectoring system 76 may differentially apply torque from an engine to wheels and/or tracks on each lateral side of the vehicle, thereby directing the vehicle 16 along a desired route. While the illustrated steering control system 64 includes the wheel angle control system 72, the differential braking system 74, and the torque vectoring system 76, it should be appreciated that alternative embodiments may include one or two of these systems, in any suitable combination. Further embodiments may include an automated steering control system 64 having other and/or additional systems to facilitate directing the vehicle 16 along the desired route.

In the illustrated embodiment, the automated speed control system 66 includes an engine output control system 78, a transmission control system 80, and a braking control system 82. The engine output control system 78 is configured to vary the output of the engine to control the speed of the vehicle 16. For example, the engine output control system 78 may vary a throttle setting of the engine, a fuel/air mixture of the engine, a timing of the engine, and/or other suitable engine parameters to control engine output. In addition, the transmission control system 80 may adjust gear selection within a transmission to control the speed of the vehicle 16. Furthermore, the braking control system 82 may adjust braking force, thereby controlling the speed of the vehicle 16. While the illustrated automated speed control system 66 includes the engine output control system 78, the transmission control system 80, and the braking control system 82, it should be appreciated that alternative embodiments may include one or two of these systems, in any suitable combination. Further embodiments may include an automated speed control system 66 having other and/or additional systems to facilitate adjusting the speed of the vehicle 16.

In the illustrated embodiment, the vehicle control system 54 includes a user interface 84 communicatively coupled to the controller 55. The user interface 84 is configured to selectively instruct the controller 55 to automatically control the vehicle 16 based on operator input. In certain embodiments, the user interface 84 includes a display 86 configured to present information to the operator, such as the one or more visualizations (e.g., maps 10, 30 and 3D model 40), which may indicate whether the vehicle 16 is within an area including rough terrain (e.g., bumps) and/or other obstacles, whether the vehicle 16 is approaching the rough area, and/or whether the vehicle 16 is outside the rough area.

As illustrated, the vehicle 16 includes manual controls 88 configured to enable an operator to control the vehicle 16 while the automatic control system is disengaged. The manual controls 88 may include manual steering control, manual transmission control, and/or manual braking control, among other controls. In the illustrated embodiment, the manual controls 88 are communicatively coupled to the controller 55. In some embodiments, the controller 55 is configured to disengage automatic control of the vehicle 16 upon receiving a signal indicative of manual control of the vehicle 16. Accordingly, if an operator controls the vehicle 16 manually, the automatic velocity reduction/enhancement process may terminate, thereby restoring control of the vehicle to the operator 16. In some embodiments, the operator may steer the vehicle 16 manually, and the automatic velocity features may remain intact (e.g., the velocity of the vehicle 16 may be adjusted automatically as set forth herein).

In the illustrated embodiment, the base station 52 includes a control system 90 including the controller 59. Similar to the vehicle controller 55, the base station controller 59 includes a processor, such as the illustrated microprocessor 92, and a memory device 94. The memory device 94 may store data related to the map of the terrain 12, such as visualizations of the map (maps 10, 30 and/or 3D model 40), the landscape of the terrain 12, location of bumps, and/or relative severities of bumps. Also, the memory device 94 may store data related to the vehicle 16, such as location of the vehicle 16 on the terrain 12, type of vehicle 16, type of sensors 62 on the vehicle 16, velocity of the vehicle 16, position of the vehicle 16, and the like.

In one embodiment, the controller 59 of the base station 52 determines the amount of speed reduction and driving direction of the autonomous vehicle 16 while operating the terrain 12. However, in some embodiments, the controller 55 of the vehicle 16 may generate a map locally and determine a target velocity and direction to travel based at least on the vehicle's proximity to an area on the visualizations including one or more bumps, the severity of the bumps, and/or the current velocity of the vehicle 16.

The controller 59 is communicatively coupled to the second transceiver 58 and configured to transmit position and velocity information to the transceiver 56. For example, the controller 59 may determine the target velocity that the vehicle 16 should drive based at least in part on signals received by the second transceiver 58 from the first transceiver 56 that indicate the vehicle's proximity to an area on the visualizations including one or more bumps, the severity of the bumps, and/or the current velocity of the vehicle 16.

In the illustrated embodiment, the base station control system 90 includes a user interface 96 configured to receive input from an operator. As discussed in detail below, the user interface 96 includes a display 98 configured to present information to the operator and/or to receive input from the operator. The display 98 may display the one or more visualizations of the map of the terrain 12. As illustrated, the user interface 96 is communicatively coupled to the controller 59.

In certain embodiments, the controller 59 is configured to determine a route and/or a target velocity of the vehicle based at least in part on the determined proximity to bumps and/or other obstacles on the visualizations, the determined current velocity of the vehicle 16, and/or the severity of the approaching bumps in the area. The controller 59 is also configured to determine steering instructions based at least in part on the route and the determined target velocity of the vehicle. Once the route is determined, the controller 59 is configured to send signals to the second transceiver 58 to communicate the determined route, steering instructions, and/or target velocity to the first transceiver 56 of the vehicle 16. The transceiver 56 may receive the signals and send the signals to the controller 55, which may instruct the automated steering control system 64 and/or the automated speed control system 66 to direct the vehicle 16 along the route using the steering instructions and/or target velocity.

For example, the route may include the originally planned route for the vehicle 16 and only the target velocity may be reduced because the bumps in the rough area are not severe. In such an instance, the vehicle 16 may proceed along its original route and slow down and/or raise the implement while driving through the area to reduce any effects the bumps may have upon the vehicle 16. Once through the area, the vehicle 16 may increase its velocity back to normal operating velocity and/or lower the implement based on signals from the base station 52. On the other hand, when the area includes severe bumps (e.g., a large ravine), the route may direct the vehicle 16 around the area entirely so as to avoid any effects the area may cause and/or inhibiting the vehicle 16 from getting stuck in the ravine. In yet other instances, the instructions from the base station 90 may cause the vehicle 16 to stop completely. For example, if a viable route cannot be ascertained within a period of time or prior to reaching the bumps, the vehicle 16 may be stopped until a route is determined or an operator provides the route.

In certain embodiments, the controller 59 is configured to adjust (e.g., along lateral and/or longitudinal directions) the route on a visualization based on input from the user interface 96. For example, an operator at the base station may periodically adjust the route for the vehicle 16 while being operated so that the vehicle 16 avoids a particularly rough area on the terrain 12. Upon adjustment of the route, the updated route is transmitted to the vehicle control system 54 (e.g., via transceivers 58, 56). Upon receiving the updated route, the vehicle control system 54 adjusts the target position such that the vehicle is steered along the route. In certain embodiments, the operator of the vehicle 16 may also adjust the route via the user interface 84 and/or manual controls 88.

Figure 6:
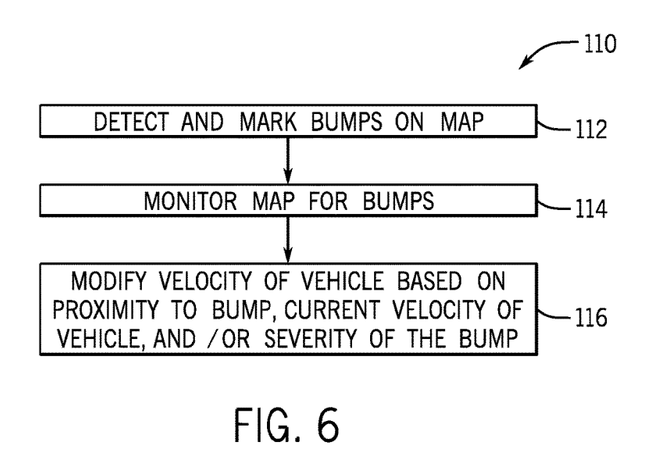
FIG. 6 is a flow diagram of an embodiment of a process suitable for marking detected bumps on a map and modifying the velocity of an autonomous agricultural vehicle based at least in part on proximity to the bumps, current velocity of the autonomous agricultural vehicle, and/or severity of the bumps.

FIG. 6 is a flow diagram of an embodiment of a process 110 suitable for marking detected bumps on a map of the terrain 12 and modifying the speed of a vehicle 16 based at least in part on the vehicle's proximity to the bumps, current speed of the vehicle 16, and/or severity of the bumps. The process 110 may be implemented as computer instructions stored on one or more tangible, non-transitory computer readable medias (e.g., memory devices 94, 70) and executable by one or more processors 92, 68. The process 110 includes detecting and marking bumps on a map (process block 112), monitoring the map for bumps (process block 114), and modifying the velocity of the vehicle 16 based at least on the vehicle's proximity to the bumps (process block 114), the current velocity of the vehicle 16, and/or seventies of the bumps (process block 116).

Figure 7:
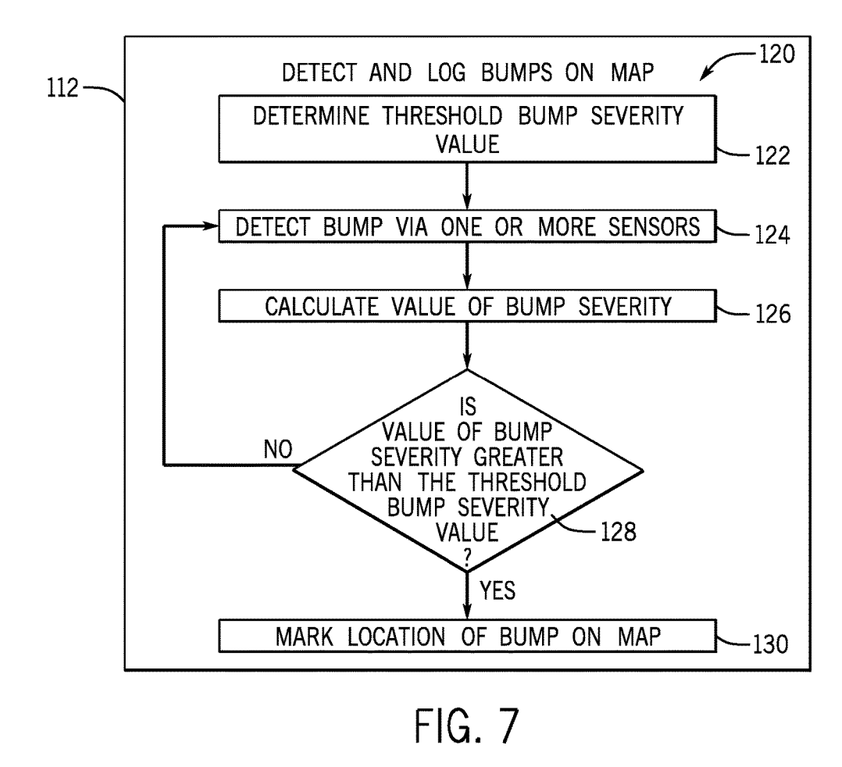
FIG. 7 is a flow diagram of an embodiment of a process suitable for marking the locations of bumps on a map based on whether a bump severity value is larger than a threshold bump severity value.

FIG. 7 is a more detailed flow diagram of an embodiment of a process 120 that may be used in process block 112 of process 110 from FIG. 6 when detecting and marking bumps on the map. The process 120 marks the locations of bumps on the map based on whether a bump severity value is larger than a threshold bump severity value. For example, the process 120 includes determining a threshold bump severity value (process block 122). The threshold bump severity value may be adjusted proportionally to the velocity of the vehicle 16 because the effect of the bumps on the vehicle 16 may vary relative to the speed of the vehicle 16. For example, bumps may be experienced more severely at higher speeds and less severely at lower speeds. Thus, the threshold bump severity value may be scaled with the velocity to account for these differences.

In some embodiments, a lookup table may be used to determine the threshold bump severity value based on the velocity of the vehicle 16. For example, the lookup table may include a set of threshold bump severity values associated with a respective velocity. The threshold bump severity values may be proportional to each speed such that the threshold bump severity values increase as the velocity increases and the threshold bump severity values decrease as the velocity decreases. Additionally or alternatively, the threshold bump severity value may be based on other factors, such as the size of the tires on the vehicle 16. For example, smaller tires feel may amplify the bump as detected by the sensors 56, for example, as compared to larger tires. Thus, the threshold bump severity value for smaller tires may be determined accordingly. Once the threshold bump severity values are determined and set for particular velocities and/or tires, for example, the threshold bump severity values may be stored in memory (e.g., devices 94, 70) for reference and comparison as the vehicle 16 experiences bumps in the terrain 12.

In process block 124, the vehicle 16 detects bumps via one or more sensors 62. As previously described, in some embodiments, the sensors 62 may include an accelerometer that measures the frequency of vibration and/or acceleration (e.g., roll rate, yaw rate, and pitch rate) and/or direction of acceleration of the vehicle 16. The data obtained via sensors 62 may be sent to the base station's controller 59 via transceivers 56 and 58. The controller 59 may calculate the value of the bump severity based at least on the roll rate, yaw rate, and/or pitch rate, and/or the velocity of the vehicle 16 (process block 126). In some embodiments, an equation to determine the bump severity value may be expressed as follows:

$$\text{BUMP SEVERITY VALUE} = \operatorname{sqrt}(\text{ROLL\_RATE}^2 + \text{YAW\_RATE}^2 + \text{PITCH\_RATE}^2)/\text{VELOCITY}$$

The controller 59 may access the appropriate threshold bump severity value (e.g., from the look up table), and compare the determined bump severity value to the threshold bump severity value for the associated velocity. The controller 59 then determines whether the bump severity value is greater than the threshold bump severity value (decision block 128). If the bump severity value is greater than the threshold bump severity value, then the controller 59 marks the location of the bump on the map (process block 130). Marking the location of the bump on the map may also include indicating the relative severity of the bump. As previously described, if the visualization being used is the heat map 30 and the bump severity value exceeds the threshold bump severity value by a certain amount or percentage, then the bump may be represented with a color (e.g., red) indicative of the bump's severity. If the bump severity value is less than the threshold bump severity value, then the process 120 returns to detecting bumps (process block 124).

In some embodiments, the bump severity values that exceed the threshold bump severity value may be filtered out during certain events or scenarios. For example, in some scenarios, the bump may be caused by a factor other than the terrain on which the vehicle 16 is driving. These extraneous bumps may be caused by events including the vehicle 16 shifting gears, the vehicle's engine speed/throttle rapidly changing, an implement attached to the vehicle hitting a bump, and so forth. Thus, the controller 59 may filter out a bump severity value that exceeds the threshold bump severity value when one of the extraneous bump events has occurred. That is, the controller 59 may receive an input (e.g., from a sensor or user) and/or make a determination related to when the vehicle gear shift will occur, when the engine speed changes rapidly, and/or when the implement will hit a known bump due to the vehicle geometry and may filter out the bumps detected during those events and/or caused by those events. In this way, the techniques may enable marking bumps on the map that are caused by the terrain 12 on which the vehicle 16 is driving, and block or inhibit marking of bumps caused by other events, such as those noted above.

In some embodiments, detecting the bump via one or more sensors 62 (process block 124) may include using data from the vehicle's spatial locating device 60 (e.g., GNSS, GPS) to create a 3D model 40 of the terrain 12 as the vehicle 16 drives across the terrain 12, as previously discussed. To achieve this, the controller 59 may determine the average velocity (e.g., magnitude and direction) of the vehicle 16. The controller 59 may receive signals indicative of the spatial locating device's position obtained by the spatial locating device 60 (via transceivers 56, 58). Using the positions of the spatial locating device the controller may detect rapid changes of the spatial locating device 60 velocity that are not proportional with changes in the average speed of the vehicle 16. Accordingly, the spatial locating device 60 may be configured to determine its position and send its position at a sufficient rate to detect the rapid changes in velocity, which may indicate bumps in the terrain 12. For example, the spatial locating device's position sampling rate may be 5 Hz, 10 Hz, 15 Hz, 20 Hz, or the like. An equation to determine a value indicative of the bump using the position of the spatial locating device 60 may be expressed as follows:

$$\text{SPATIAL\_LOCATING\_DEVICE\_BUMP} = \text{sqrt}((\text{LAT\_VEL} - \text{AVG\_LAT\_VEL})^2 + (\text{LON\_VEL} - \text{AVG\_LON\_VEL})^2)$$

"LAT_VEL" and "LON_VEL" may represent instantaneous velocity values or velocity values averaged over a very short period of time. "AVG_LAT_VEL" and "AVG_LON_VEL" may represent the velocities averaged over a longer period of time. The average values may be obtained from the spatial locating device, one or more other sources (e.g., wheel speed sensors, radar ground speed sensors), or some combination thereof. When the velocity of the spatial locating device changes disproportionately to the average velocity of the vehicle 16 (e.g., the velocity of the spatial locating device exceeds the average velocity) (decision block 128), then the location and severity of the bumps may be marked on the map (process block 130). In some embodiments, the velocity of the spatial locating device may be used (e.g., by the controller 59) to determine a severity of the bumps, which may be indicated on the map.

It should be understood that, in some embodiments, a combination of data obtained via the sensors 62 and/or the spatial locating device may be used to determine the location of the bumps, severity of the bumps, and to generate the visualizations of the maps. For example, the spatial locating device bump calculation may be used in conjunction with the calculation of the bump severity value to determine whether to mark the bumps and to develop the terrain 12 in the one or more visualizations.

Figure 8:
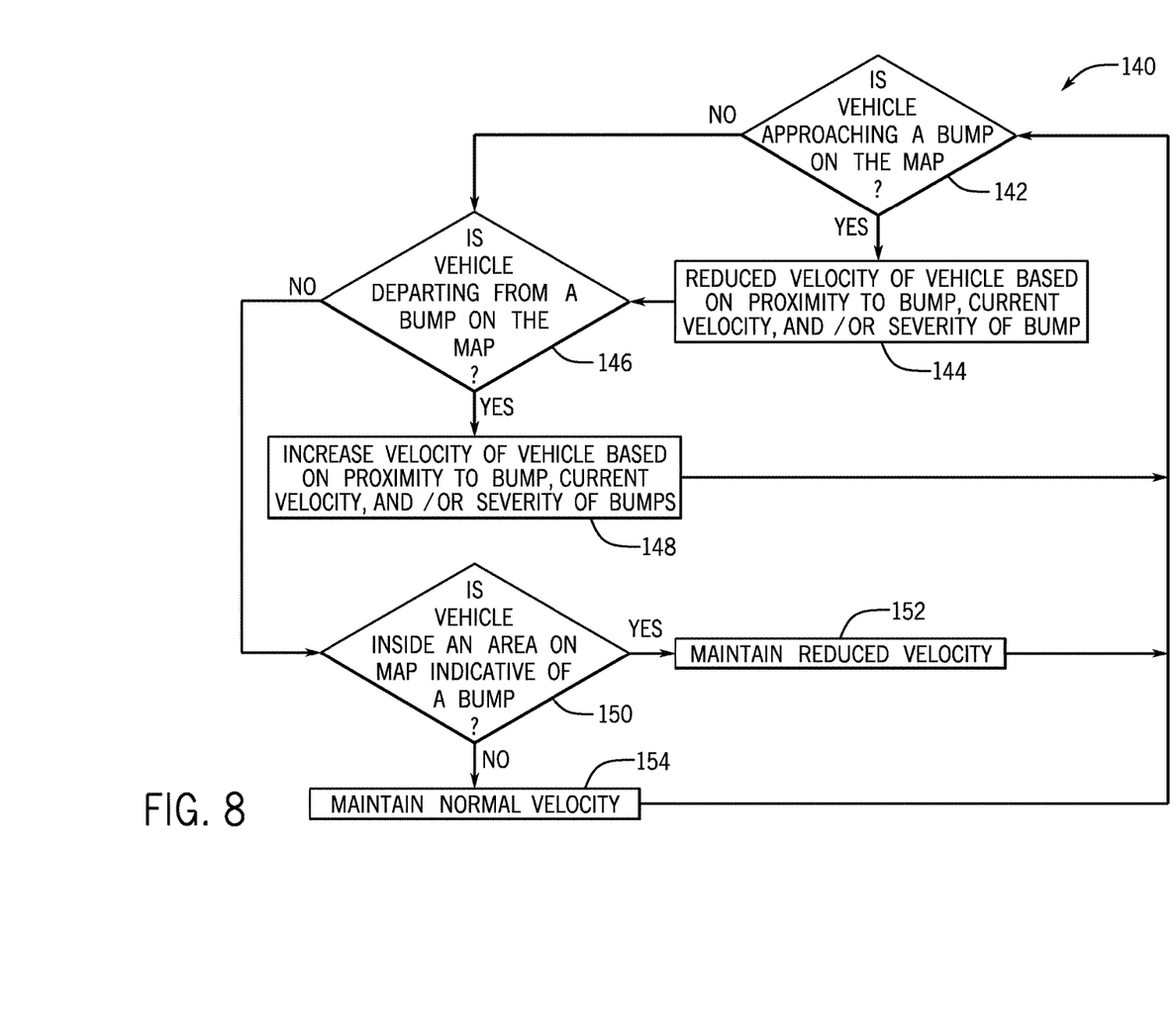
FIG. 8 is a flow diagram of an embodiment of a process suitable for modifying the velocity of an autonomous agricultural vehicle based at least on proximity of the autonomous agricultural vehicle to the bumps, a current velocity of the autonomous agricultural vehicle, and/or the severity of the bumps.

FIG. 8 is a flow diagram of an embodiment of a process 140 suitable for modifying the velocity of the vehicle 16 based at least on proximity of the vehicle 16 to the bumps, a current velocity of the vehicle 16, and/or the severity of the bumps. The process 140 may be implemented as computer instructions stored on one or more tangible, non-transitory machine-readable medias (e.g., memories 94, 70) and executable by one or more processors 92, 68. It should be understood that any modifications to the velocity and directions may be communicated via the controller 59 to the second transceiver 58. The second transceiver 58 may send the instructions to the first transceiver 56, which communicates the instructions to the vehicle's controller 55. If the instructions include an increase or decrease in velocity, the controller 55 instructs the speed control system 66 accordingly. If the instructions include a new route or direction, the controller 55 instructs the steering control system 64 accordingly.

The process 140 includes determining whether the vehicle 16 is approaching a bump on the map (decision block 142). The controller 59 may make this determination by monitoring the location of the vehicle 16 relative to previously identified severe bumps (e.g., based on the visualization). In some instances, this determination is made when the vehicle 16 enters the area marked on the visualization that surrounds the actual bump (e.g. perimeter).

If the vehicle 16 is approaching an identified bump on the map, then the controller 59 is configured to reduce the velocity of the vehicle based on the proximity to the bump, current velocity of the vehicle 16, and/or severity of the bump (process block 144). For example, the closer the vehicle 16 gets to the bump on the map, the slower the vehicle's velocity may be set. That is, the vehicle's velocity may be reduced (e.g., to a first target velocity) when the vehicle initially enters the area surrounding the actual bump, and then reduced further down to a set minimum velocity (e.g., a lower second target velocity) as the vehicle nears the bump. Also, the current velocity of the vehicle 16 may influence the amount of velocity reduction. That is, if the current velocity is approximately equal to the set minimum velocity or some acceptable percentage or amount greater than the set minimum velocity, then minimal or no velocity reduction is applied. On the other hand, if the current velocity is greater than the set minimum velocity or is not within some acceptable percentage of the set minimum velocity, then the velocity may be reduced (e.g., to the set minimum velocity). In addition, the severity of the bump may influence the set minimum velocity to which the vehicle 16 is adjusted, and thus, the amount of velocity reduction applied to the vehicle 16. For example, if a minor bump is present on the visualization, then the vehicle's velocity is slowed slightly (e.g., to a higher set minimum velocity), whereas if a larger bump is approaching, then the vehicle's velocity is slowed more heavily (e.g., to a lower set minimum velocity) or the vehicle may be stopped or redirected entirely around the bump.

If the vehicle 16 is not approaching or near an identified bump on the map, or the velocity of the vehicle 16 has been reduced because the vehicle 16 is approaching an identified bump on the map, then the controller 59 determines whether the vehicle is departing from a bump on the map (decision block 146). The controller may make this determination by monitoring the location of the vehicle 16 relative to previously identified bumps (e.g., based on the visualizations). If the vehicle 16 is departing from a bump on the map, then the controller 59 sends signals to the vehicle control system 54 to increase the velocity of the vehicle based on the proximity to the bump, the current velocity of the vehicle 16, and/or the severity of the bumps (process block 148).

For example, the velocity of the vehicle 16 may be gradually increased as the vehicle 16 drives further away from the bumps. Also, the amount of velocity increase may be based on the current velocity of the vehicle 16. That is, if the vehicle 16 is already driving at a velocity near its normal operating velocity (e.g., velocity prior to approaching the bump) then the velocity increase may be minor. However, when the vehicle 16 is driving substantially slower than its normal operating velocity while near severe bumps, then the amount of velocity increase may be greater. In addition, the amount that the velocity is increased may be based on the severity of the bumps. When the bumps are less severe, the increase in velocity may be minor and when the bumps are more severe, the increase in velocity may be greater to return the vehicle 16 to its normal operating velocity. In this way, the current velocity of the vehicle 16 and the severity of the bumps may similarly affect the amount of increase in the velocity as the vehicle 16 departs from the bump. After the velocity of the vehicle 16 is increased, the process 140 returns to determining whether the vehicle is approaching another bump on the map (process block 142). It should be noted that the implement may be accounted for when managing the bumps. For example, in some embodiments, the speed of the vehicle 16 may not be increased until the implement has traversed the location on the map indicative of the bump.

If the vehicle is not departing from a bump on the map, then the controller 59 determines whether the vehicle is inside an area on the map indicative of a bump (decision block 150). If the vehicle 16 is inside an area on the map indicative of a bump, then the controller 59 instructs the vehicle's control system 54 to maintain the reduced velocity (e.g., the first speed and/or the set minimum speed) while inside the area (process block 152). Then, the controller 59 continues to determine whether the vehicle 16 is approaching a bump on the map (process block 142). If the vehicle 16 is not inside an area indicative of a bump on the map, then the controller 59 instructs the vehicle to maintain normal velocity as it traverses the terrain 12 (process block 154). Then, the controller 59 continues to determine whether the vehicle 16 is approaching a bump on the map (process block 142). In this way, the velocity of the vehicle 16 may be modified as it traverses the terrain 12 based at least on the proximity of the vehicle 16 to the bumps, the current velocity of the vehicle 16, and/or the severity of the bumps to inhibit the effects that the bumps may have on the vehicle 16.

While only certain features of the subject matter have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A control system for a base station, comprising:
a first transceiver configured to receive a first signal from a second transceiver of an agricultural vehicle and to send a second signal to the second transceiver, wherein the first signal is indicative of at least an acceleration of the agricultural vehicle, a current velocity of the agricultural vehicle, and a location relative to a terrain where the agricultural vehicle experienced the acceleration, and the second signal is indicative of at least a target velocity for the agricultural vehicle; and
a first controller communicatively coupled to the first transceiver, wherein the first controller is configured to:
determine a bump severity value based at least in part on the acceleration and the current velocity of the agricultural vehicle;
mark an area indicative of a bump on a map of the terrain when the bump severity value exceeds a threshold bump severity value at the location where the agricultural vehicle experienced the acceleration; and
automatically generate the second signal when the agricultural vehicle enters the area on the map, wherein the target velocity is based at least in part on a proximity of the agricultural vehicle to the bump, the bump severity value, or a combination thereof.

2. The control system of claim 1, wherein the map of the terrain is displayed via a visualization on a display, the visualization comprising a two-dimensional (2D) map showing the area indicative of the bump, or a heat map with the area indicative of the bump color-coded based on the bump severity value.

3. The control system of claim 1, wherein the map of the terrain is displayed via a visualization on a display, the visualization comprising a three-dimensional (3D) model showing the area indicative of the bump sensed based on velocity changes of a spatial locating device attached to the agricultural vehicle that are not proportional with changes in an average velocity of the agricultural vehicle, and the velocity of the spatial locating device are included in the first signal.

4. The control system of claim 1, wherein the first signal is generated via a second controller of the agricultural vehicle based on data obtained via one or more sensors coupled to the agricultural vehicle, the one or more sensors comprising an accelerometer, a global positioning system, a global navigation satellite system, an optical sensor, a radio-frequency sensor, or some combination thereof.

5. The control system of claim 1, wherein the first controller is configured to filter out bump severity values that exceed threshold bump severity values during a gear shift event, during a rapid change in velocity of the agricultural vehicle, as an implement attached to the agricultural vehicle passes through the area indicative of the bump, or some combination thereof.

6. The control system of claim 1, wherein the target velocity is set lower when the bump severity value exceeds the threshold bump severity value by a first amount than when the bump severity value exceeds the threshold bump severity value by a second amount that is less than the first amount, and the target velocity is set lower when the agricultural vehicle is closer to the location where the agricultural vehicle experienced the acceleration in the area than when the agricultural vehicle is farther away from the location where the agricultural vehicle experienced the acceleration in the area.

7. The control system of claim 1, wherein the first controller is configured to expand the area on the map of the terrain when subsequent first signals are received by the first transceiver and the determined bump severity values exceed the threshold bump severity values.

8. The control system of claim 1, wherein the acceleration comprises a yaw rate, a pitch rate, and a roll rate.

9. The control system of claim 1, wherein the threshold bump severity value is based on the current velocity.

10. The control system of claim 1, wherein the second signal comprises an alternate route around the location where the agricultural vehicle experienced the acceleration or the target velocity is set to zero when the bump severity value exceeds the threshold bump severity value by a predetermined amount.

11. A method for controlling an agricultural vehicle, comprising:
accessing, using a processor, a threshold bump severity value proportional to a velocity of an agricultural vehicle;
receiving, at the processor, data indicative of a bump in a terrain from one or more sensors coupled to the agricultural vehicle;
determining, using the processor, a bump severity value based on the data;
marking, using the processor, an area indicative of the bump on a map of the terrain when the bump severity value exceeds the threshold bump severity value;
monitoring, using the processor, a location of the agricultural vehicle relative to the terrain on the map based on data indicative of the location received from the one or more sensors; and
automatically generating a signal, using the processor, that instructs the agricultural vehicle to modify its velocity based at least in part on the location of the agricultural vehicle relative to the area, the bump severity value, or a combination thereof.

12. The method of claim 11, wherein the signal instructs the agricultural vehicle to reduce its velocity when entering the area and to increase its velocity when exiting the area.

13. The method of claim 11, wherein the signal instructs the agricultural vehicle to reduce its velocity to a first target velocity when the bump severity value exceeds the threshold bump severity value by a first amount, and to reduce its velocity to a second target velocity, greater than the first target velocity, when the bump severity value exceeds the threshold bump severity value by a second amount, less than the first amount.

14. The method of claim 11, wherein the one or more sensors comprise:
an accelerometer configured to provide data indicative of an acceleration of the agricultural vehicle when the agricultural vehicle contacts the bump; and
a spatial locating device configured to provide data indicative of the location of the agricultural vehicle relative to the terrain.

15. The method of claim 11, comprising generating a three-dimensional (3D) model representing the map of the terrain showing the area indicative of the bump based on velocity changes of a spatial locating device attached to the agricultural vehicle that are not proportional with changes in an average velocity of the agricultural vehicle.

16. The method of claim 11, comprising filtering out the bump severity value that exceeds the threshold bump severity value during a gear shift event, during a rapid change in velocity of the agricultural vehicle, as an implement attached to the agricultural vehicle passes through the area, or some combination thereof.

17. The method of claim 11, wherein the signal instructs an automated speed control system of the agricultural vehicle to reduce the velocity of the agricultural vehicle based at least in part on proximity to the bump, the bump severity value, or some combination thereof.

18. A autonomous agricultural system, comprising:
an agricultural vehicle, comprising:
a first transceiver configured to send a first signal to a second transceiver of a base station and to receive a second signal from the second transceiver of the base station, wherein the first signal is indicative of at least an acceleration of the agricultural vehicle, a current velocity of the agricultural vehicle, and a location, relative to a terrain, of the agricultural vehicle where the agricultural vehicle experienced the acceleration, and the second signal is indicative of at least a target velocity or a route for the agricultural vehicle;
a first controller communicatively coupled to the first transceiver, wherein the first controller is configured to automatically control the agricultural vehicle based at least in part on the second signal by instructing an automated steering control system and an automated speed control system to direct the agricultural vehicle according to the target velocity or the route;
a sensor communicatively coupled to the first controller, wherein the sensor is configured to detect the acceleration;
a spatial locating device communicatively coupled to the first controller, wherein the spatial locating device is configured to obtain data indicative of the location and the current velocity of the agricultural vehicle; and
the base station, comprising:
the second transceiver configured to receive the first signal and send the second signal;
a second controller communicatively coupled to the second transceiver, wherein the second controller is configured to:
determine a bump severity value based on the acceleration and the current velocity of the agricultural vehicle, and to identify an area indicative of a bump within the terrain when the bump severity value exceeds a bump value threshold at the location, relative to the terrain, where the agricultural vehicle experienced the acceleration; and
automatically generate the second signal indicative of at least the target velocity or the route when the agricultural vehicle enters the area, wherein the target velocity is based on a proximity to the bump, a severity of the bump, or a combination thereof.

19. The autonomous agricultural system of claim 18, wherein the second controller is configured to:
generate one or more visualizations representing a map of the terrain for display on a display, wherein the visualizations comprise a two-dimensional map or a heat map, and the second controller uses line fitting, blob detection, or some combination thereof to expand the area marked on the map.

20. The autonomous agricultural system of claim 18, wherein the second controller is configured to generate a three-dimensional (3D) model representing the map of the terrain showing the area indicative of the bump based on velocity changes of the spatial locating device that are not proportional with changes in an average velocity of the agricultural vehicle.

* * * * *